C. A. DEARBORN.

Carriage-Tops.

No. 5,720. Reissued Jan. 6, 1874.

WITNESSES

George E. Upham.

Phil. C. Hasi.

By

INVENTOR

C. A. Dearborn

Chipman & Somers Co.

ATTORNEYS.

AM. PHOTO-LITHOGRAPHIC CO. N.Y. (OSBORNE'S PROCESS.)

UNITED STATES PATENT OFFICE.

CHARLES A. DEARBORN, OF NEW BEDFORD, MASSACHUSETTS.

IMPROVEMENT IN CARRIAGE-TOPS.

Specification forming part of Letters Patent No. 144,069, dated October 28, 1873; reissue No. 5,720, dated January 6, 1874; application filed December 8, 1873.

*To all whom it may concern:*

Be it known that I, CHARLES A. DEARBORN, of New Bedford, in the county of Bristol and State of Massachusetts, have invented a new and valuable Improvement in Buggy-Tops, of which the following is a full and exact description, reference being had to the accompanying drawings making a part of this specification, in which—

Figure 1:
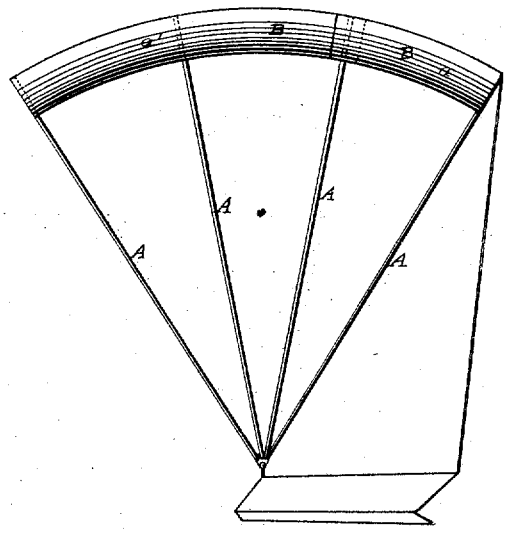
Figure 2:
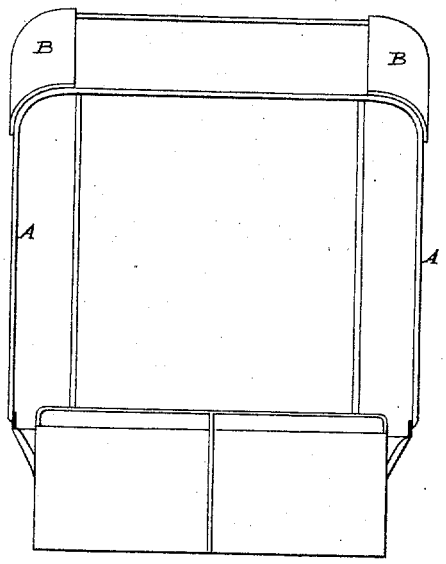
Figure 3:
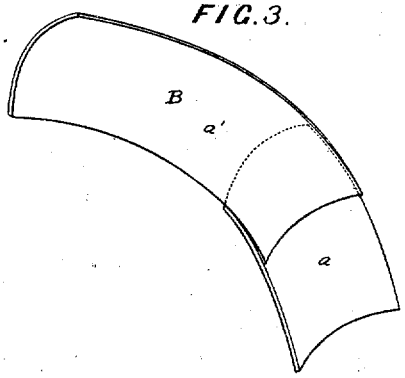

Figure 1 is a side view of a buggy-top with my plates attached. Fig. 2 is a rear view of a buggy-top, showing a rear end view of said plates; and Fig. 3 is a detail, showing such plates unattached.

The object of this invention is to provide a smooth, unbroken, and substantial form over which the leather may be drawn into shape, and thereby to render the exterior of buggy-tops smooth and gracefully rounded at the bends and between the bows, and to preserve this shape from alteration.

The invention has relation to the construction of buggy-tops; and it consists in the introduction and arrangement on the corners of the bows, under the covering-leather, of curved corner-plates, having sufficient stiffness or rigidity to retain its shape without support, which constitute smooth, unbroken, and permanent forms for the top, avoiding the use of the ordinary hair-pads, which are objectionable, obviating all unsightly sagging between the bows, and materially increasing the durability of the top.

In the accompanying drawings, the letter A indicates the ordinary bows of a buggy-top. B represents concavo-convex corner-pieces or interior supports, having a longitudinal curvature corresponding with the radius of the top, and a transverse curvature similar to that of the bends of the bows, which are usually well rounded.

If the top is not designed to fold, the corner-piece for each side may be made entire, or in sections, rigidly secured together or to the bows.

When the top is designed to fold, as illustrated in the drawings, the sections are arranged to slide one within the other. Of the sections forming each corner-piece, as illustrated, the rear sections, or section *a*, are the shortest usually, and the forward section *a'* of about double the length of a rear section. In securing these parts to the bows, it is preferred to fasten the longest section by both of its ends, while each short section, designed to slide over the section in front of it, is secured by one end.

The number of sections will vary with the number of bows, and many different methods of attachment will readily suggest themselves to those skilled in the art.

These plates B provide a strong and durable form for the leather of the top, supporting it at all points in the bends, preventing it from sagging or wrinkling, preserving it in unbroken convexity, and avoiding the use of the ordinary hair-stuffing and the evil results attending the same.

I claim as my invention—

Corner-plates B, for buggy-tops, having a longitudinal curvature corresponding with the radius of the top, and transverse curvature fitting the rounded corners of the bows, substanstantially as specified.

In testimony that I claim the above I have hereunto subscribed my name in the presence of two witnesses.

CHARLES A. DEARBORN.

Attest:

PHIL. C. MASI,
GEORGE E. UPHAM.